United States Patent [19]
Cho

[11] Patent Number: 5,687,946
[45] Date of Patent: Nov. 18, 1997

[54] UMBRELLA COUPLER AND ACCESSORIES THERETO

[76] Inventor: Donald D. Cho, 823 Milton Rd., Inverness, Ill. 60067

[21] Appl. No.: 418,796

[22] Filed: Apr. 7, 1995

[51] Int. Cl.⁶ ................................................. F16M 13/00
[52] U.S. Cl. ............................ 248/530; 248/156; 248/159; 248/533
[58] Field of Search ............................. 248/536, 514, 248/519, 534, 518, 156, 532, 533, 158, 411, 159, 157, 545, 511, 523, 539

[56] References Cited

U.S. PATENT DOCUMENTS

| | | | |
|---|---|---|---|
| 2,195,391 | 3/1940 | Hunter | 248/156 |
| 2,628,797 | 2/1953 | Campomar | 248/545 |
| 2,877,828 | 3/1959 | Barnette, Jr. | 248/533 |
| 3,602,466 | 8/1971 | Drowns | 248/514 |
| 4,102,353 | 7/1978 | Pugliese | 135/5 R |
| 4,483,506 | 11/1984 | Litwiller | 248/545 |
| 4,520,985 | 6/1985 | Blumenthal | 248/530 |
| 4,649,678 | 3/1987 | Lamson | 248/530 |
| 4,832,304 | 5/1989 | Morgulis | 248/533 |
| 4,836,231 | 6/1989 | Peterson | 135/98 |
| 5,046,699 | 9/1991 | Perreault et al. | 248/533 |
| 5,108,058 | 4/1992 | White | 248/532 |
| 5,152,495 | 10/1992 | Jacinto et al. | 248/530 |
| 5,156,369 | 10/1992 | Tizzoni | 248/545 |
| 5,161,561 | 11/1992 | Jamieson | 248/530 |
| 5,277,211 | 1/1994 | Hendershot | 135/16 |

Primary Examiner—Alvin C. Chin-Shue
Assistant Examiner—Anita King
Attorney, Agent, or Firm—James P. Hanrath

[57] ABSTRACT

An umbrella coupler for the support of an umbrella having a shaft and a handle comprises an umbrella coupler assembly having a lower portion either integral with or capable of being connected to a supportive base to maintain an umbrella in an upright active position when engaged in the umbrella coupler assembly. Varying embodiments of the umbrella coupler assembly are provided with a preferred umbrella coupler assembly having a lower portion supporting a seat member, an upper portion, and a middle wall portion extending at least partially upwardly from the seat member and to the upper portion and further having an opening dimensioned to receive and support either a vertically orientated handle or a J-shaped umbrella handle. The upper portion preferably has an arm extending at an upper end thereof connected to a support element capable of achieving an open and closed position for selective vertical support of the shaft of the umbrella to maintain the umbrella in an upright active position when engaged in the umbrella coupler assembly.

15 Claims, 15 Drawing Sheets

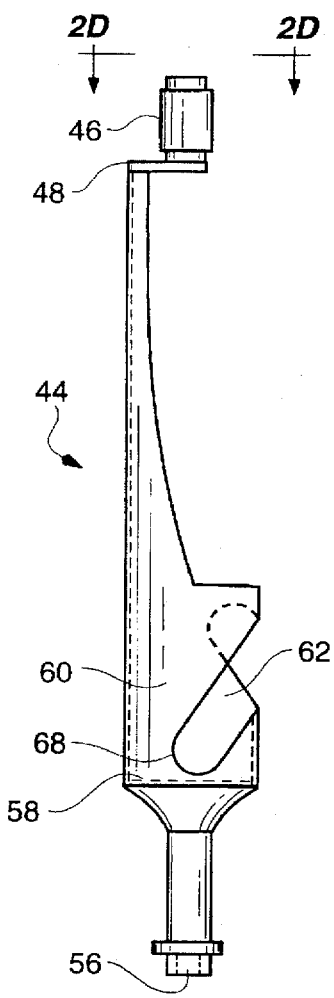
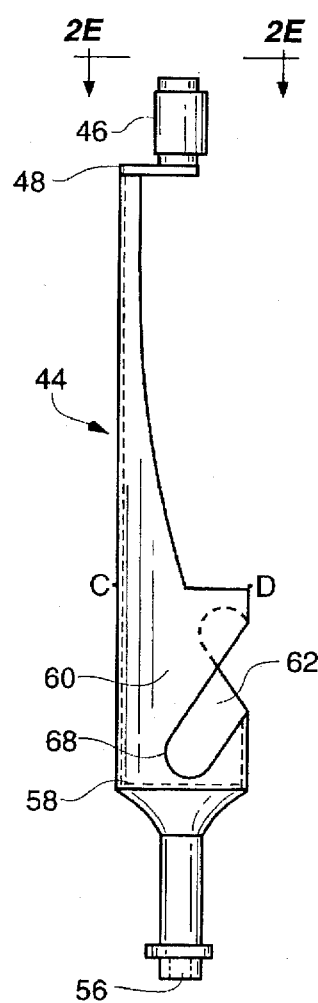
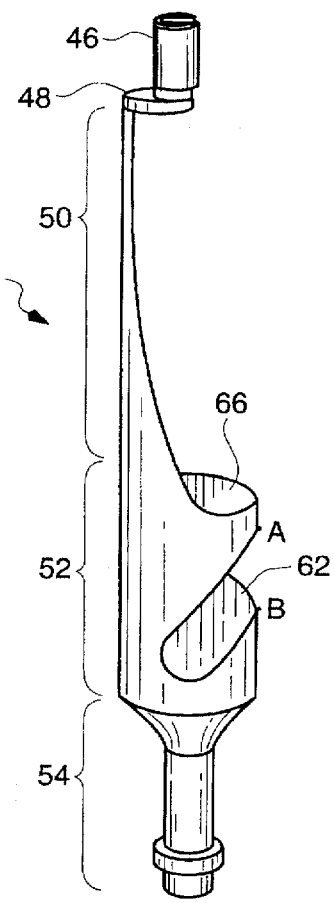
FIG. 2A          FIG. 2B          FIG. 2C
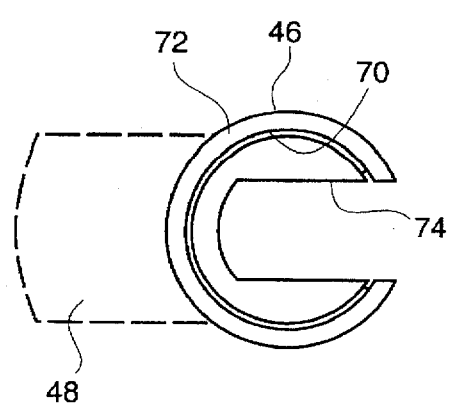
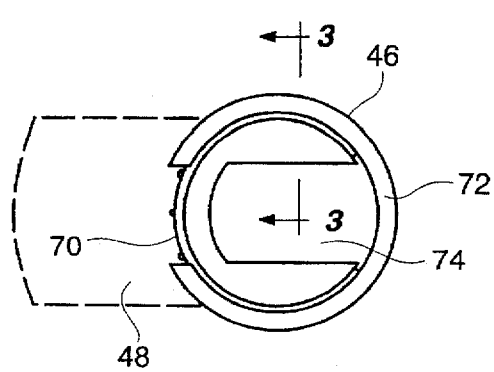
FIG. 2D          FIG. 2E

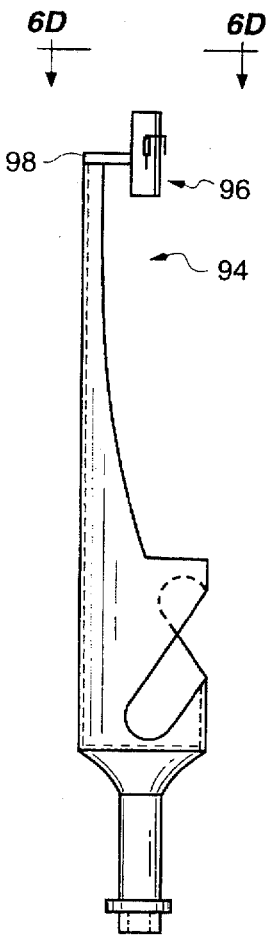
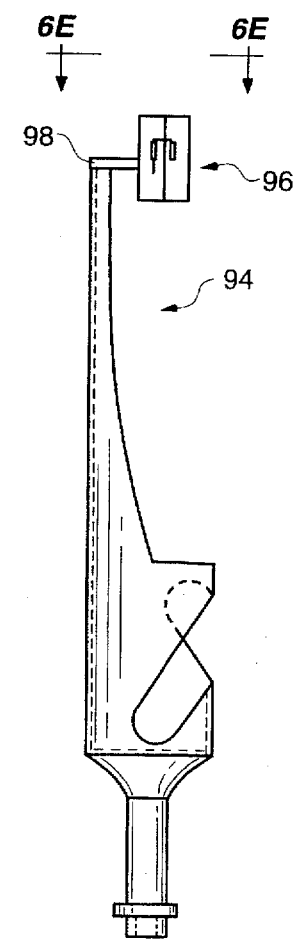
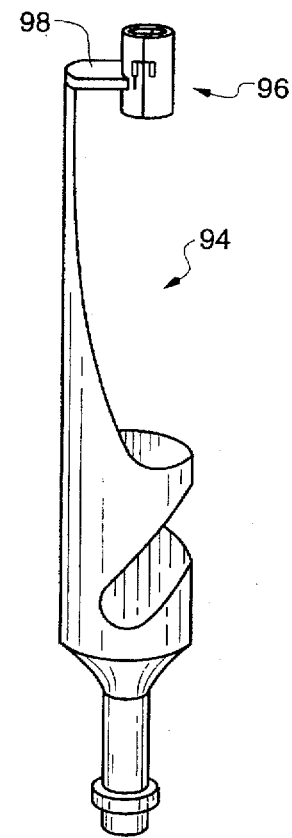
FIG. 6A          FIG. 6B          FIG. 6C
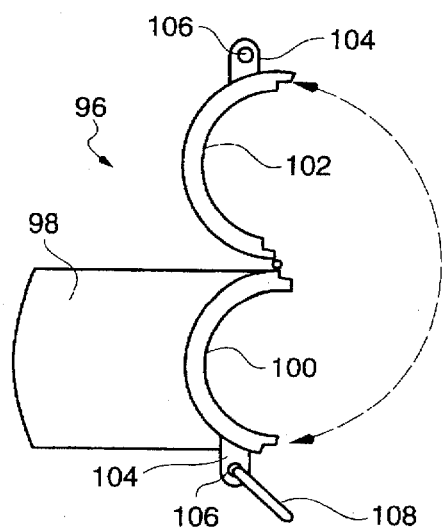
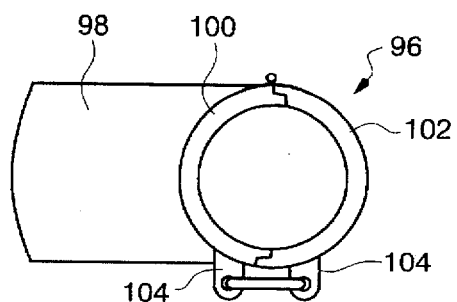
FIG. 6D          FIG. 6E

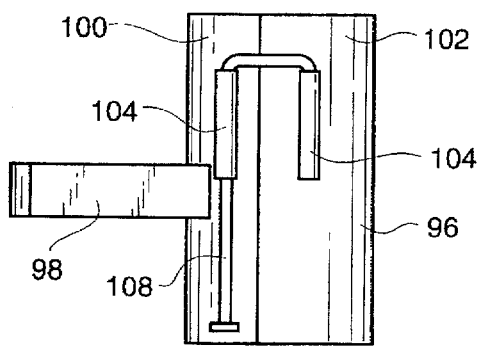
FIG. 7
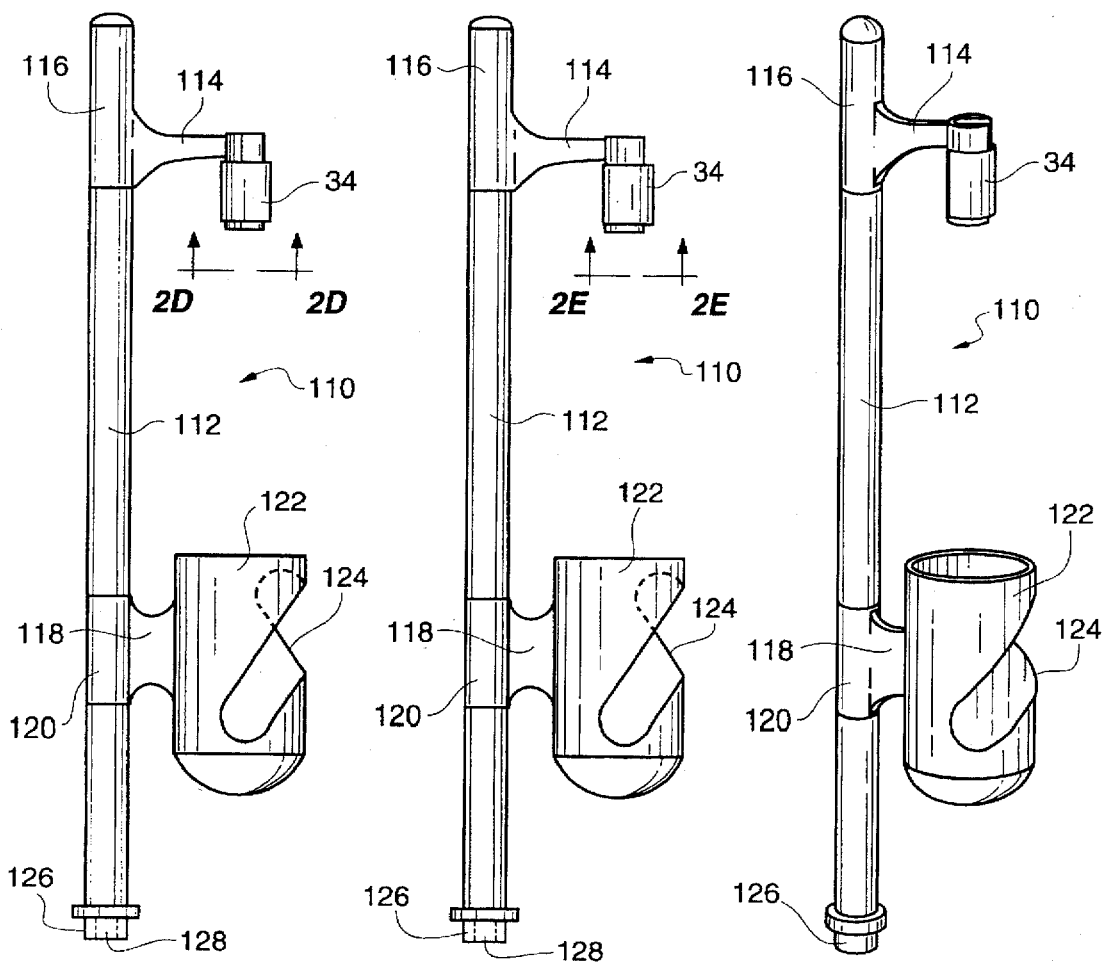
FIG. 8A  FIG. 8B  FIG. 8C

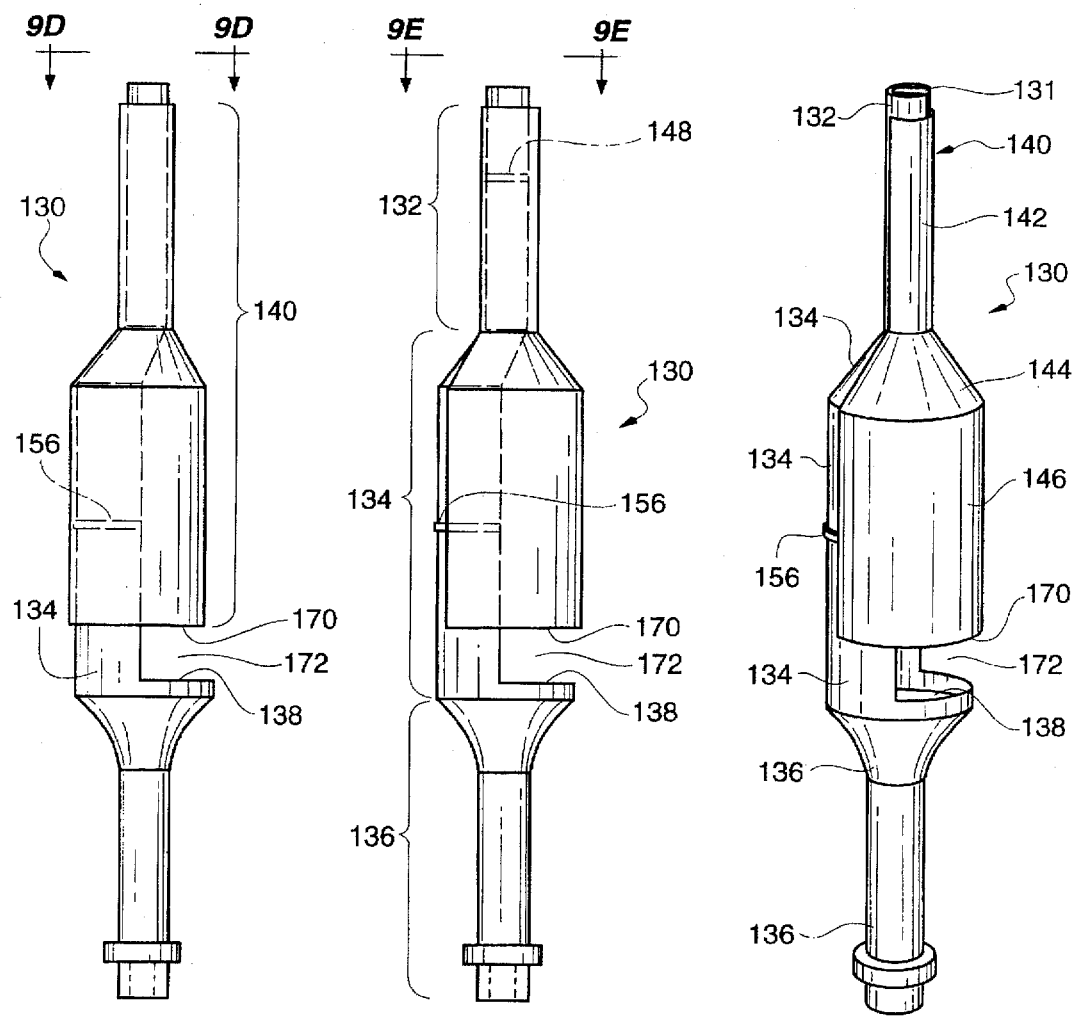
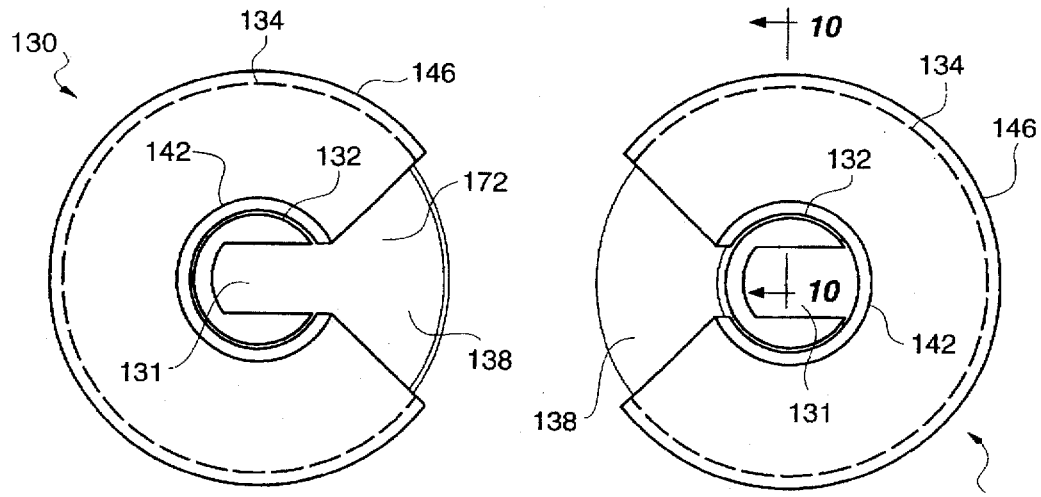
FIG. 9A  FIG. 9B  FIG. 9C
FIG. 9D  FIG. 9E

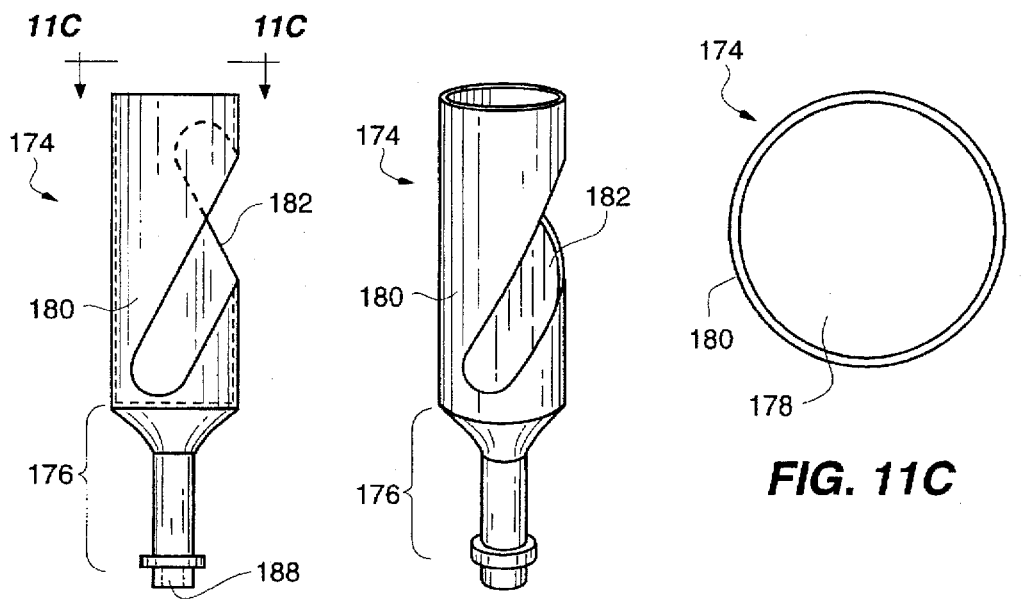
FIG. 11A  FIG. 11B  FIG. 11C
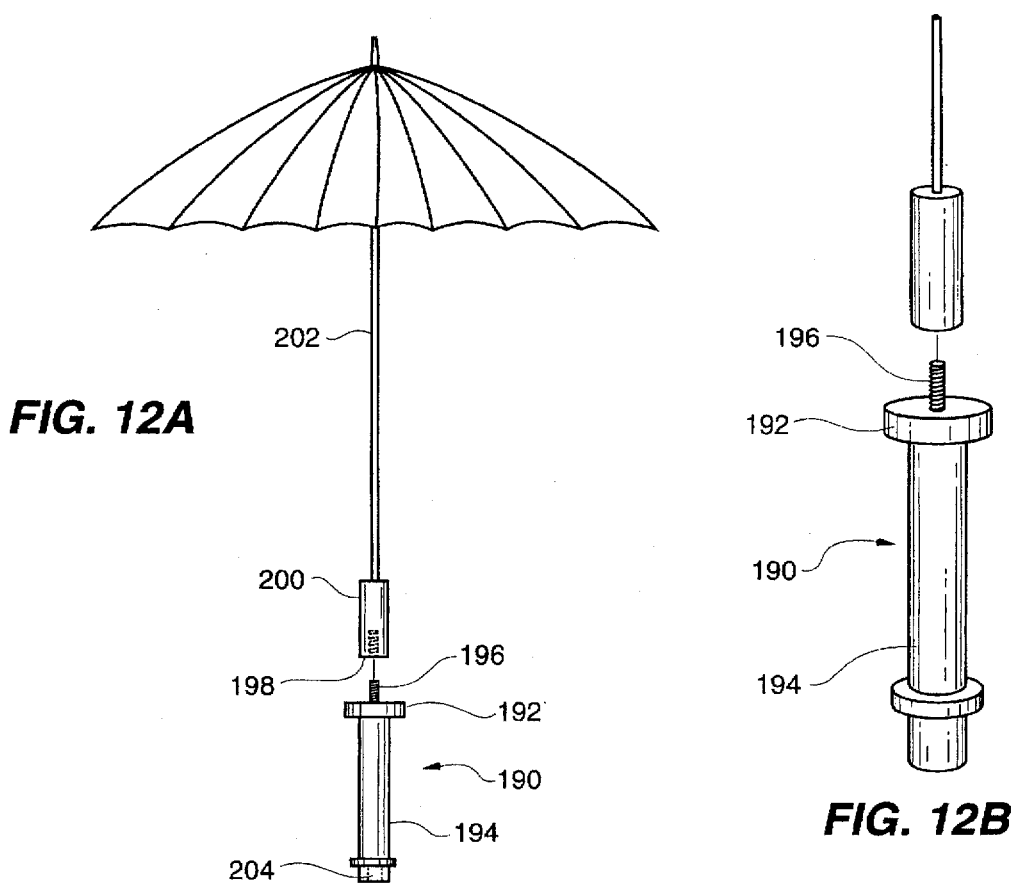
FIG. 12A  FIG. 12B

UMBRELLA COUPLER AND ACCESSORIES THERETO

BACKGROUND OF THE INVENTION

1. Field of the Invention

The present invention relates generally to an umbrella anchoring device, and more particularly pertains to various new and improved umbrella couplers for the support of an umbrella, and preferably for the support of an umbrella having a shaft with either a J-shaped or vertically orientated handle at a lower end thereof, the umbrella couplers being integral with or capable of being connected to a supportive base such as a spiked shaft to maintain the umbrella in an upright active position and to prevent the umbrella from being inverted or blown away by a wind.

2. Description of the Related Art Including Information Disclosed Under 37 CFR §1.97–1.99

Beach, golf, or common umbrellas of various types have been utilized in the prior art and typically, they are subject to hazards presented by prevailing winds or individuals inadvertently contacting the umbrella inducing the umbrella to tip and pivot requiring its repositioning. Additionally, certain umbrella users, such as golfers during play, must step away from a umbrella during selected activity periods, such as when a golfer must use both hands on a golf club to play a shot. At such times, the umbrella must be held by another person or collapsed, to prevent the same from being blown by the wind. Thus, a need for an anchoring device for securing an umbrella has been identified.

Examples of prior umbrella anchoring devices are disclosed in the following U.S. patents:

| U.S. Pat. No. | Patentee |
| --- | --- |
| 4,832,304 | Morgulis |
| 5,046,699 | Perreault et al. |
| 5,156,369 | Tizzoni |
| 5,293,889 | Hall et al. |

In U.S. Pat. No. 4,832,304 there is disclosed a ground-anchoring device, particularly for umbrellas, for anchoring a pole in the ground which comprises a post formed with spiral threads at one end for threading into the ground, a socket at the opposite end for receiving an end of the pole to be anchored in the ground, and a pair of arms pivotally mounted at the opposite end of the post from a horizontal position facilitating the rotation of the post to thread it into the ground, or to a vertical position. The pair of arms include clamping elements movable to a releasing position with respect to the socket when the arms are in their horizontal position, or to a clamping position when the arms are in their vertical positions to clamp the pole within the socket. The socket for receiving the umbrella pole consists of a post of a tapered hollow construction so that its upper open end defines the socket. The pair of arms in their upper vertical position are effective to clamp the umbrella pole to firmly hold it within the socket, the arms being formed with a curved cross-section to engage the pole therein and thereby to aid in supporting the pole within the socket where they are clamped by cam element.

In U.S. Pat. No. 5,046,699 there is disclosed an anchoring device for securing a post, such as a beach umbrella, into the ground comprising a hollow tubular member for vertically holding the post, a screw member at the lower end of the tubular member, a pair of laterally extending lever arms at the upper end of the tubular member for twisting the screw member and the tubular member and driving both into the ground. Again, the upright post of the umbrella is inserted into a hollow tubular member at a depth sufficient to maintain the verticality of the post.

In U.S. Pat. No. 5,156,369 there is disclosed a ground anchoring arrangement for attachment to, for example, the pole of a beach umbrella or the like consisting of a hollow cylindrical member having a rod rotatably supported therein. A spiral screw is attached to one end of the rod, and the other end of the rod is grippingly attachable to a handle rotator. Thus, when the handle rotator is rotated, the rod rotates, and the spiral screw rotates with it. The point of the screw is placed adjacent to the ground and rotated so that the screw digs itself into the earth to firmly affix the elongated cylinder in the ground.

In U.S. Pat. No. 5,293,889 there is disclosed a beach umbrella having a lowermost section assembled selectively with an intermediate and upper section, with the upper section including an umbrella canopy mounted thereto. The lowermost section includes a plurality of handles pivotally mounted about an upper collar of the lower section to enhance rotation of the lower section, with the lower section provided with a screw thread directed about a lowermost portion of the lower section to permit projecting of the lowermost section into an underlying beach surface to secure the umbrella in a fixed relationship to the beach. Latch means are arranged to secure the sections together.

Such prior art patents are particularly designed for the support of a pole-type umbrella specifically cooperative with the umbrella anchoring structure and are ill suited to anchor pre-existing golf or common umbrellas having a handle, particularly J-shaped handle umbrellas. The present invention in a broad sense comprises an umbrella coupler for the support of such pre-existing umbrellas having a shaft and either a J-shaped or vertically orientated handle at a lower end thereof. Alternatively, the umbrella coupler of the present invention may be suited for support of umbrellas having specific handle configurations. Still further, the umbrella coupler of the present invention is designed for cooperative engagement with a variety of supportive bases and other accessories hereinafter described.

SUMMARY OF THE INVENTION

According to the invention there is provided an umbrella coupler for the support of an umbrella having a shaft and either a J-shaped or vertically orientated handle at a lower end of the shaft comprising an umbrella coupler assembly having a lower portion, a seat surface supported by the lower portion, a middle wall portion upon or bordering the seat surface, an upper portion, and an arm extending from the upper portion, the middle wall portion at least partially extending upwardly from the seat surface to the upper portion and further having an opening dimensioned to receive and support a J-shaped umbrella handle, and support means connected to the arm for selective vertical support of the shaft of the umbrella.

Alternatively, the umbrella coupler of the present invention provides for an umbrella coupler for the support of an umbrella having a shaft and either a J-shaped or vertically orientated handle at a lower end of the shaft comprising:

an umbrella coupler assembly comprising a shaft, a first arm extending from an upper portion of the shaft, a second arm extending from a lower portion of the shaft, support means connected to the first arm for selective vertical support of the shaft of the umbrella, and a support cup member connected to the second arm, the support cup member having an opening dimensioned to receive and support a J-shaped umbrella handle.

Alternatively, the umbrella coupler of the present invention provides for an umbrella coupler for the support of an umbrella having a shaft and either a J-shaped or vertically orientated handle at a lower end of the shaft comprising:

an umbrella coupler assembly having a lower portion, a seat surface supported by the lower portion, a wall portion upon or bordering the seat surface, and an upper portion, the wall portion at least partially extending upwardly from the seat surface to the upper portion, and support means connected to at least one of said upper portion or wall portion and extending downwardly partially over the wall portion for selective vertical support of the shaft of the umbrella upon rotational movement of the support means.

Alternatively, the umbrella coupler of the present invention provides for an umbrella coupler for the support of an umbrella having a shaft and either a J-shaped or vertically orientated handle at a lower end of the shaft comprising:

a support body, a seat surface supported by the support body, a wall upon or bordering the seat surface extending at least partially upwardly from the seat member a distance sufficient to vertically support the shaft of the umbrella, the wall further having an opening dimensioned to receive and support a J-shaped umbrella handle.

Alternatively, the umbrella coupler of the present invention provides for an umbrella coupler for the support of an umbrella having a shaft and a threaded handle at a lower end of the shaft comprising:

an umbrella coupler assembly having a lower portion, and an upper cup portion supported by the lower portion, the upper cup portion having a threaded bore capable of receiving the threaded handle of the umbrella to secure the umbrella thereto.

Alternatively, the umbrella coupler of the present invention provides for an umbrella coupler for the support of an umbrella having a shaft and a handle at a lower end of the shaft comprising:

an umbrella coupler assembly having a lower portion, an upper cup portion supported by the lower portion, the upper cup portion having a bore capable of receiving the handle of the umbrella to secure the umbrella thereto.

The various embodiments of the umbrella coupler of the present invention are further suited to be integral with or connected to a supportive base to maintain pre-existing hand held umbrellas in an upright active position when engaged in the umbrella coupler assembly. The supportive base may comprise a one piece support shaft having a spike portion at a lower end thereof. The spike portion preferably includes a foot ledge to aid in the setting of the spike portion of the support shaft into a ground surface. The supportive base may also comprise a multipiece support shaft at least one piece of which has a bore therein for receiving another piece of the multipiece support shaft. Still further, the multipiece support shaft may include means for securing the vertical depth at which at least one piece of the multipiece support shaft sets into the bore. Alternatively, the multipiece support shaft may have an intermediate section bordered by means for securing the intermediate section to its neighboring sections such that the means for securing allow the intermediate section to be set at a selected angle. Still further, the supportive base for the umbrella couplers of the present invention may further include a cup or other accessories attachable to the supportive base. Finally the supportive base need not be spiked set to a ground surface, but may be mounted to a wall surface or other base.

The preferred embodiments of the present invention advantageously provide a support for pre-existing hand held umbrellas regardless whether they have J-shaped or vertically orientated handles at a lower end of the umbrella shaft.

Additional features and advantages of the present invention will become apparent to those skilled in the art from the following description and accompanying figures illustrating the preferred embodiments of the invention, the same being the present mode for carrying out the invention.

BRIEF DESCRIPTION OF THE DRAWINGS

FIG. 2A is a side elevational view, with hidden lines, of an umbrella coupler assembly similar to that illustrated in FIG. 1 which shows support means for selective vertical support of the shaft of an umbrella atop an arm connected to an upper portion of the umbrella coupler assembly (rather than attached below the arm as in FIG. 1). The support means in FIG. 2A is in an open position.

FIG. 2B is a side elevational view of the umbrella coupler assembly, with hidden lines, similar to FIG. 2A and shows the support means in a closed position.

FIG. 2C is a side perspective view of the umbrella coupler assembly of FIG. 2B.

FIG. 2D is a top view of the support means in an open position and is taken along line 2D—2D in FIG. 2A and 2D—2D in FIG. 8A.

FIG. 2E is a top view of the support means in a closed position taken along line 2E—2E in FIG. 2B and 2E—2E in FIG. 8B.

FIG. 6A is a side elevational view, with hidden lines, of an umbrella coupler assembly similar to that illustrated in FIG. 1 which shows an alternative support means for selective vertical support of the shaft of an umbrella laterally joined to an arm connected to an upper portion of the umbrella coupler assembly (rather than attached below the arm as in FIG. 1). The alternative support means in FIG. 6A is in an open position.

FIG. 6B is a side elevational view of the umbrella coupler assembly, with hidden lines, similar to FIG. 6A and shows the alternative support means in a closed position.

FIG. 6C is a side perspective view of the umbrella coupler assembly of FIG. 6B.

FIG. 6D is a top view of the alternative support means in an open position and is taken along line 6D—6D in FIG. 6A.

FIG. 6E is a top view of the alternative support means in a closed position and is taken along line 6E—6E in FIG. 6B.

FIG. 7 is a side elevational view of the alternative support means shown at FIG. 6B and shows the locking pin thereof maintaining the alternative support means in a locked position.

FIG. 8A is a side elevational view, with hidden lines, of another umbrella coupler assembly constructed in accordance to the teachings of the present invention which shows support means for selective vertical support of the shaft of an umbrella joined to a first arm extending from an upper portion of a shaft, the support means being vertically aligned above a support cup member connected to a second arm extending from an lower portion of a shaft. The support means in FIG. 8A is in an open position.

FIG. 8B is a side elevational view of the umbrella coupler assembly, with hidden lines, similar to FIG. 8A and shows the support means in a closed position.

FIG. 8C is a side perspective view of the alternative umbrella coupler assembly of FIG. 8B.

FIG. 9A is a side elevational view, with hidden lines, of yet another umbrella coupler assembly constructed in accordance to the teachings of the present invention which shows yet another support means for selective vertical support of the shaft of an umbrella connected both to an upper portion and a middle wall portion of the umbrella coupler assembly and extending downwardly partially over the middle wall portion. The support means in FIG. 9A is in an open position.

FIG. 9B is a side elevational view of the umbrella coupler assembly, with hidden lines, similar to FIG. 9A and shows the support means in a closed position.

FIG. 9C is a side perspective view of the alternative umbrella coupler assembly of FIG. 9B.

FIG. 9D is a top view of the alternative support means in an open position and is taken along line 9D—9D in FIG. 9A.

FIG. 9E is a top view of the support means in a closed position and is taken along line 9E—9E in FIG. 9B.

FIG. 11A is a side elevational view, with hidden lines, of still another umbrella coupler assembly constructed in accordance to the teachings of the present invention which shows a wall portion with an opening dimension to receive and support a J-shape umbrella handle, the wall portion extending upwardly a distance sufficient to vertically support the shaft of the umbrella.

FIG. 11B is a perspective view of the umbrella coupler assembly shown in FIG. 11A.

FIG. 11C is a top view of the umbrella coupler assembly shown in FIG. 11A.

FIG. 12A is a side elevational view of still another umbrella coupler assembly constructed in accordance to the teachings of the present invention which shows the umbrella coupler assembly at an upper end thereof having a threaded rod thereon capable of a threaded engagement with the threaded bore of an umbrella handle.

FIG. 12B is a fragmentary perspective view of the umbrella coupler/assembly and umbrella handle shown in FIG. 12A.

DESCRIPTION OF THE PREFERRED EMBODIMENTS

Figure 1:
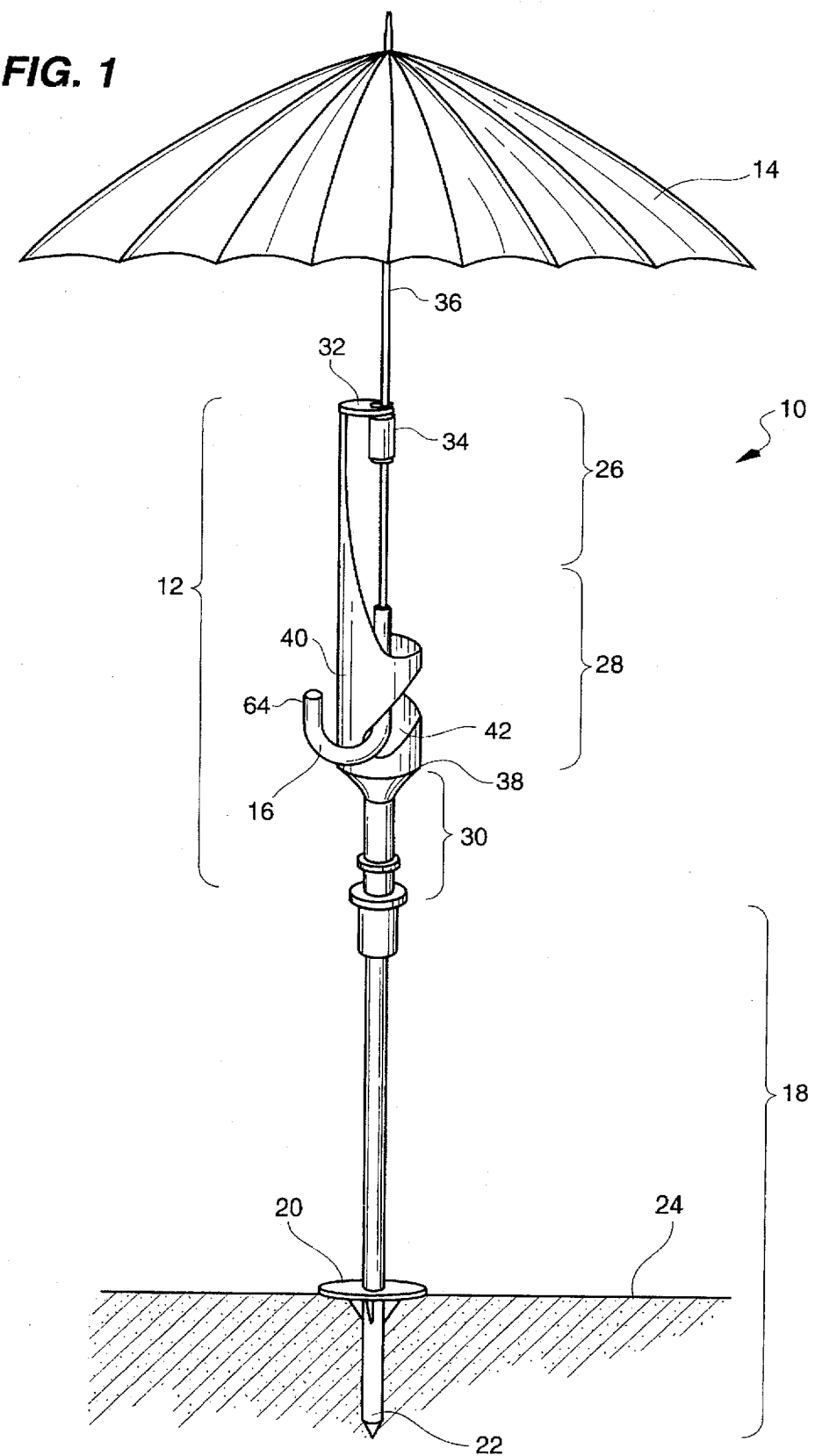
FIG. 1 is a front view of an umbrella coupler constructed in accordance to the teachings of the present invention and shows an umbrella coupler assembly mounted upon a vertical rod, the umbrella coupler assembly maintaining a J-shaped handle umbrella in an upright active position.
Figure 3:
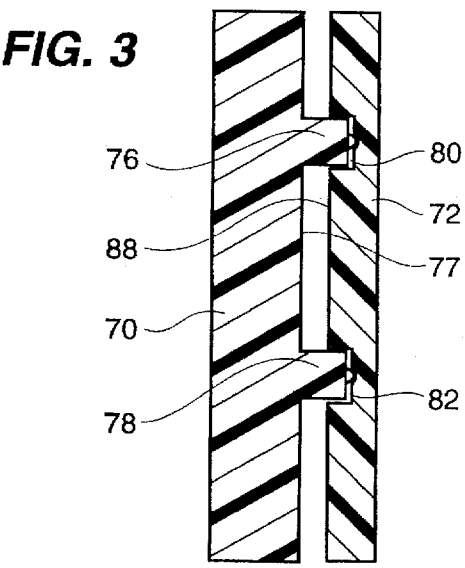
FIG. 3 is a sectional view of the support means in a closed position, is taken along line 3—3 of FIG. 2E, and shows the cooperative relationship between outer and inner partial rings comprising the support means.

Referring now to the drawings, and more particularly to FIG. 1, there is shown a perspective view of an umbrella spike 10 comprising an umbrella coupler assembly 12 fixedly holding in an upright active position umbrella 14 having a J-shaped handle 16, the umbrella coupler assembly 12 being connected upon a supportive base 18. Supportive base 18 has foot flange 20 at a lower portion thereof above spike end 22 to aid in the setting of spike end 22 into a ground surface 24.

Coupler assembly 12 of FIG. 1 has an upper portion 26, a middle portion 28, a lower portion 30, and an arm 32 extending from upper portion 26 connected to a support means 34 for selected vertical support of shaft 36 of the umbrella 14. The support means 34 is shown in FIG. 1 connected to the lower end of arm 32 but, as illustrated in FIGS. 2A through 2E, the same may be supported atop arm 32 or, as illustrated in FIGS. 6A through 6E, may be connected traverse of a supporting arm.

The lower portion 30 of the umbrella coupler assembly 12 of FIG. 1 supports a seat surface 38, the seat surface having a wall portion 40 thereupon which extends at least partially upwardly from the seat surface 38 and to said upper portion 26. The wall portion 40 further has an opening 42 dimensioned to receive and support the J-shaped umbrella handle 16 of umbrella 14.

Referring now to FIG. 2C there is shown a side perspective view of umbrella coupler assembly 44, which is similar to umbrella coupler assembly 12 shown in FIG. 1 but with support means 46 now supported atop arm 48. Again, umbrella coupler assembly 44 comprises an upper portion 50, a middle portion 52, a lower portion 54, and an arm 48 extending from the upper end of upper portion 50. As best observed at FIG. 2A and FIG. 2B, lower portion 54 at a bottom end thereof has a threaded bore 56 such that the umbrella coupler assembly 44 can be cooperatively mounted upon a supportive base having a threaded rod at a top thereof (see for example FIG. 12B at 190, 192, 194, and 196). Lower portion 54 also supports a seat surface 58 having a wall portion 60 thereupon, the wall portion extending at least partially upward from the seat surface 58 and to upper portion 50. Wall portion 60 also has an opening 62 dimensioned to receive and support a J-shaped umbrella handle. More specifically, opening 62 is dimensioned such that the distance of point A to point B is greater than the outside diameter of toe 64 of J-shaped umbrella handle 16 illustrated at FIG. 1. Wall portion 60 extending upwardly from seat surface 58 also forms an annular top opening 66 wherein the distance of point C to point D thereof is sufficient to accommodate the diameter of a vertically orientated handle of an umbrella such that the same can be vertically supported resting upon seat surface 58.

Opening 62 in wall portion 60 extends at an oblique angle inwardly of wall portion 60, preferably a 45 degree angle such that when a J-shaped handle is inserted in opening 62 and turned inwardly of wall portion 60 the J-shaped handle can be set in abutment against lower edge 68 of opening 62.

FIG. 2D and FIG. 2E are top views of the support means 46 for selective vertical support of the shaft of an umbrella showing the support means in an open position and in a closed position, respectively. Support means 46 is comprised of an inner partial ring 70 set upon arm 48 and outer partial ring 72 which fully surrounds inner partial ring 70 when support means 46 is in an open position. Arm 48 has a U-shaped hollow 74 at its outwardly extended end.

Outer partial ring 72 is capable of rotational movement about inner partial ring 70 to achieve a close position, as illustrated in FIG. 2E.

Figure 5:
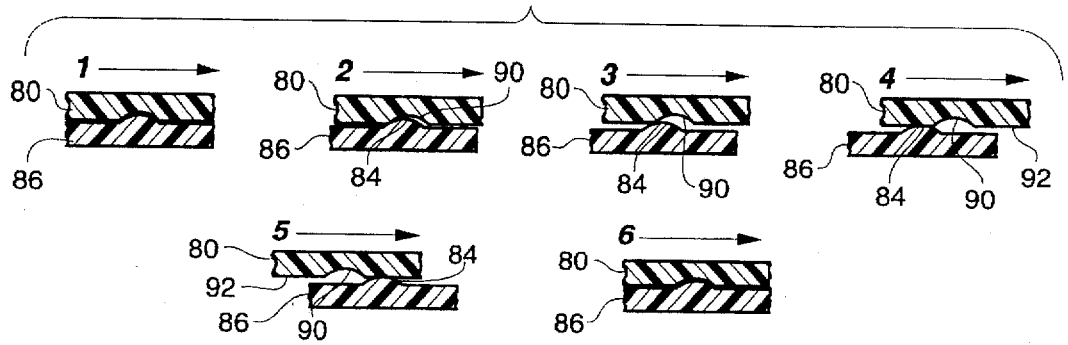
FIG. 5 is a schematic illustration consisting of positions 1, 2, 3, 4, 5, and 6 and shows the path of travel of a rail knob on the rail of an inner partial ring, the rail knob being in a fully seated position with respect to the seating aperture of the rail receiving groove of an outer partial ring at position 1 and moving from such fully seated position to a fully nonseated position at position 4 and back to a fully seated position within another seating aperture at position 6.

FIGS. 3, 4A, 4B, and FIG. 5 illustrate the cooperative nature of the inner partial ring 70 to outer partial ring 72. In the cross-sectional view of FIG. 3, inner partial ring 70 has upper rail 76 and lower rail 78 projecting from its outer facing annular periphery 77 such that upper rail 76 and lower rail 78 are received into upper rail receiving groove 80 and lower rail receiving groove 82, respectively, of the inside annular periphery 88 of outer partial ring 72. As best observed in the fragmentary view of FIG. 4A, upper rail 76 of inner partial ring 70 has a plurality of seating knobs 84 at its outer side periphery 86. Upper rail 76 and the seating knobs 84 ride within upper rail receiving groove 80 at the inside annular periphery 88 of outer partial ring 72 illustrated at FIG. 4B. Each rail receiving groove such as upper rail receiving groove 80 has a plurality of seating apertures 90 capable of receiving the seating knobs 84 of each rail such as upper rail 76 on the outer side periphery 86 of inner partial ring 70 of FIG. 4A. In this regard, FIG. 5 is a schematic showing of the relationship of movement of the upper rail receiving groove 80 of outer partial ring 72 upon seating knob 84 of the outer side periphery 86 of upper rail 76 of inner partial ring 70. In position 1, the seating knob 84 is fully seated within seated within seating aperture 90 of the upper rail receiving groove 80 of the outer partial ring 72. Rotational movement of the outer partial ring 72 forces seating aperture 90 away from seating knob 84 in position 2 until the seating aperture 90 is separated from seating knob 84 as in position 3 until further rotational movement of the outer partial ring 72 results in the seating knob 84 riding along the outer periphery 92 of upper rail receiving groove 80 of outer partial ring 72 as in position 4. Further rotational movement of the outer partial ring 72 brings the seating knob 84 into near engagement with another seating aperture 90 of the upper rail receiving groove 80 of the outer partial ring 72 as in position 5 until further rotation again seats the seating knob 84 with another seating aperture 90 as in position 6.

The support means comprising cooperative inner and outer partial rings such as support means 34 of FIG. 1 or support means 46 of FIG. 2 achieves both an open and close position for selective vertical support of the shaft of an umbrella placed within umbrella coupler assembly 12 or 44, respectively.

In contradistinction to a support means disposed above or below arm 48 of umbrella coupler assembly 12 or respectively, FIG. 6C is a perspective view of an umbrella coupler assembly 94 having support means comprised of an annular clasp 96 laterally joined to arm 98. As best illustrated in the top view of FIG. 6D, annular clasp 96 has a fixed portion 100 mounted to arm 98 which is cooperative with a swing portion 102. When annular clasp 96 is in an open position, such as illustrated at FIGS. 6A and FIG. 6D, the fixed portion 100 of annular clasp 96 can receive the shaft of an umbrella in abutment therewith. Then, the annular clasp 96 can be moved to a closed position, as illustrated in FIG. 6B and FIG. 6E, by movement of swing portion 102 to fixed portion 100. Both fixed portion 100 and swing portion 102 of annular clasp 96 have a flange 104 at a common side end thereof, each flange having a hole 106 for cooperation with close pin 108 to lock the annular clasp 96 in its closed position, as illustrated in the top view of FIG. 6E or the side elevational view of FIG. 7.

It is noted that with the exception of support means 96 and arm 98, the alternative umbrella coupler assembly 94 illustrated at FIGS. 6A, 6B, and 6C is the same in other respects as the umbrella coupler assembly 44 heretofore described at FIGS. 2A, 2B, and 2C.

Referring now to FIG. 8C, there is shown a side perspective view of another embodiment of an umbrella coupler of the present invention for the support of an umbrella having a shaft and either a J-shaped or vertically orientated handle at a lower end of the shaft comprising an umbrella coupler assembly 110. Umbrella coupler assembly 110 has a shaft 112, the shaft having a first arm member 114 extending from an upper portion 116 thereof which is connected to support means 34 for selective vertical support of the shaft of an umbrella. Support means 34 of umbrella coupler assembly 110 illustrated in FIGS. 8A, 8B, and 8C is the same as the downwardly extending support means 34 illustrated at FIG. 1 and operated in the same manner as the upwardly extending support means 46 heretofore described with respect to FIGS. 2A, 2B, and 2C to achieve an open and close position for selective vertical support of a shaft of an umbrella. FIG. 8A shows the support means 34 in an open position and FIG. 8B shows the support means 34 in a closed position. Shaft 112 also has a second arm member 118 extending from a lower portion 120 thereof which is connected to a support cup member 122. Support cup member 122 has an opening 124 dimensioned to receive and support a J-shaped umbrella handle which is the same as previously described with respect to the opening 42 of the wall portion 40 of umbrella coupler assembly 12 of FIG. 1 or opening 62 of the wall portion 60 illustrated at FIGS. 2A, 2B, and 2C. Shaft 112 at the lower end 126 thereof can be integral with or capable of being connected to a supportive base for vertical support of the umbrella coupler assembly 110 to maintain an umbrella in an upright active position when engaged in umbrella coupler assembly 110. In this regard, shaft 112 at its lower end 126 has threaded bore 128 which can be cooperative with a threaded rod of a supportive base.

In FIG. 9A through FIG. 9E there is illustrated yet another embodiment of the umbrella coupler of the present invention for the support of an umbrella having a shaft and either a J-shaped or vertically orientated handle at the lower end of the shaft. Umbrella coupler assembly 130 has an upper portion 132 forming a partial ring having a vertical opening 131, a middle wall portion 134 forming a partial ring, and a lower portion 136 supporting a seat surface 138. Seat surface 138 has a middle wall portion 134 thereupon which extends upward from the seat surface 138 at one side thereof to upper portion 132. Upper portion 132 is connected to support means 140 which is capable of achieving, by rotation, an open and closed position for selective and removable vertical support of the shaft of an umbrella. In this regard, FIG. 9A and FIG. 9D show the support means 140 of umbrella coupler assembly 130 in an open position, while FIG. 9B and FIG. 9E show the support means 140 in a closed position.

Figure 10:
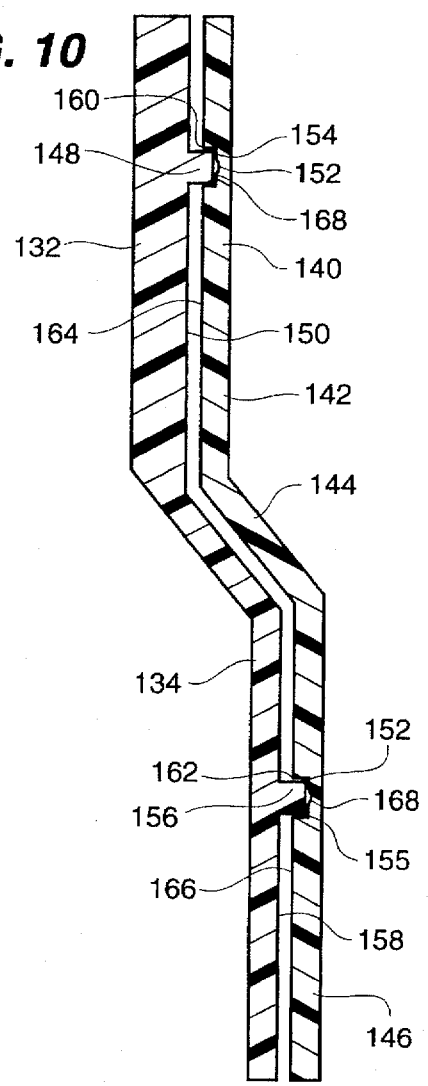
FIG. 10 is a sectional view of the alternative support means in a closed position, is taken along line 10—10 of FIG. 9E, and shows the cooperative relationship between outer and inner partial rings comprising the support means.
Figure 4A:
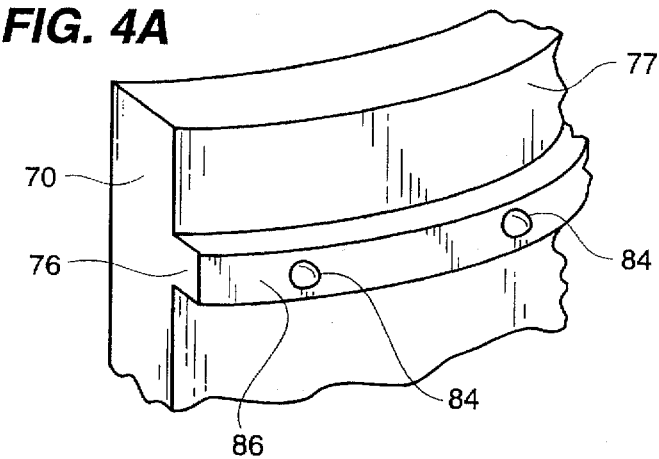
FIG. 4A is a fragmentary perspective view of an inner partial ring of the support means shown at FIG. 3 and shows a rail at its outer facing annular periphery having a plurality of seating knobs at the outer periphery of the rail.
Figure 4B:
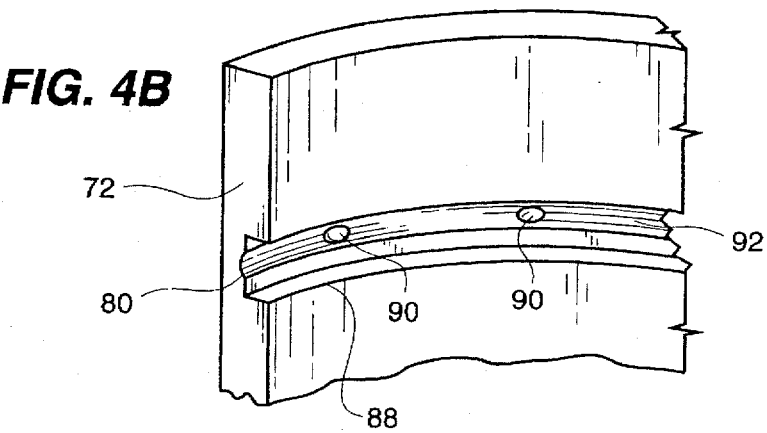
FIG. 4B is a fragmentary perspective view of an outer partial ring of the support means shown at FIG. 3 and shows a rail receiving groove in its inner facing annular periphery having a plurality of seating apertures capable of receiving the rail seating knobs of FIG. 4A.

As best observed in the cross-sectional view of FIG. 10, support means 140 has an upper portion 142, an intermediate portion 144 extending outwardly from upper portion 142 and lower portion 146. The combined diameter of upper portion 142 of support member 140 and upper portion 132 of umbrella coupler assembly 130 is suited to encapture the shaft of an umbrella while the greater combined diameter of the lower portion 146 of support means 140 and middle wall portion 134 of umbrella coupler assembly 130 can accommodate the increased diameter of a vertically orientated handle at the lower end of an umbrella shaft. Upper portion 132 and middle wall portion 134 of umbrella coupler assembly 130 each form an inner partial ring above seat surface 138 (see FIG. 9D). In FIG. 10 upper portion 132 has an upper rail 148 projecting from its outer facing annular periphery 150. Upper rail 148 has a plurality of seating knobs 152 at its outer side periphery 154. Similarly, middle wall portion 134 has a lower rail 156 projecting from its outer facing annular periphery 158 (see FIG. 10), the lower rail having a plurality of seating knobs 152 at its outer side periphery 155. These upper and lower rails are cooperatively received within upper rail receiving groove 160 and lower rail receiving groove 162, respectively, of the inner facing annular periphery 164 and 166 of upper portion 142 and lower portion 146, respectively, of support means 140. Upper and lower rail receiving grooves 160 and 162 each have a plurality of seating apertures 168 to receive the seating knobs 152 of the upper and lower rails 148 and 156 in a manner heretofore described with respect to FIGS. 3, 4A and 4B, and FIG. 5. Regardless of whether support means 140 is in an open position as in FIG. 9A and FIG. 9D or a closed position as in FIG. 9B and FIG. 9E, bottom end 170 of support means 146 does not extend to the seat surface 138, thus leaving the seat surface 138 and bottom end 170 of support means 140 to form an opening 172 sufficient to encapture the diameter of a J-shaped umbrella handle when such an umbrella is in an upright active position engaged within umbrella coupler assembly 130.

FIG. 11A, 11B, and 11C illustrate yet another embodiment of an umbrella coupler of the present invention for the support of an umbrella having a shaft and either a J-shaped or vertically orientated handle at a lower end of the shaft. As illustrated in FIGS. 11A and 11B, umbrella coupler assembly 174 comprises a lower portion 176, a seat surface 178 supported by the lower portion, and a wall portion 180 at least partially extending from the seat surface 178 and having an opening 182 dimensioned to receive and support a J-shaped umbrella handle. Opening 182 is dimensioned in a manner similar to opening 62 heretofore described at FIGS. 2A through 2C or FIGS. 6A through 6C but extends obliquely inwardly of wall portion 180 to a greater extent due to wall portion 180 extending upwardly a distance sufficient to yield vertical support of an umbrella shaft engaged therein. In this regard the wall portion 180 at its top surface 184 forms an annular passage 186 to receive and support either a J-shaped umbrella handle or a vertically orientated handle of an umbrella shaft. Lower portion 176 of umbrella assembly 174 may be integral with or capable of being connected to (e.g. by threaded bore 188) a supportive base for vertical support of the support body to maintain an umbrella in an upright active position when engaged in the umbrella coupler assembly 174.

FIGS. 12A and 12B illustrate another embodiment of the umbrella coupler of the present invention for the support of an umbrella having a shaft and a handle at the lower end of the shaft having a threaded bore. In this embodiment, the umbrella coupler assembly 190 has a head 192 upon a vertical shaft 194, the head having a threaded rod 196 thereon capable of a threaded engagement with the threaded bore 198 of handle 200 to thereby secure the umbrella 202 to the umbrella coupler assembly 190. The umbrella coupler assembly 190 as in other embodiments may be integral with or capable of being connected to (such as by means of threaded bore 204) a supportive base for vertical support of the umbrella coupler assembly to maintain the umbrella in an upright active position when engaged on the umbrella coupler assembly 190.

Figures 13A, 13B:
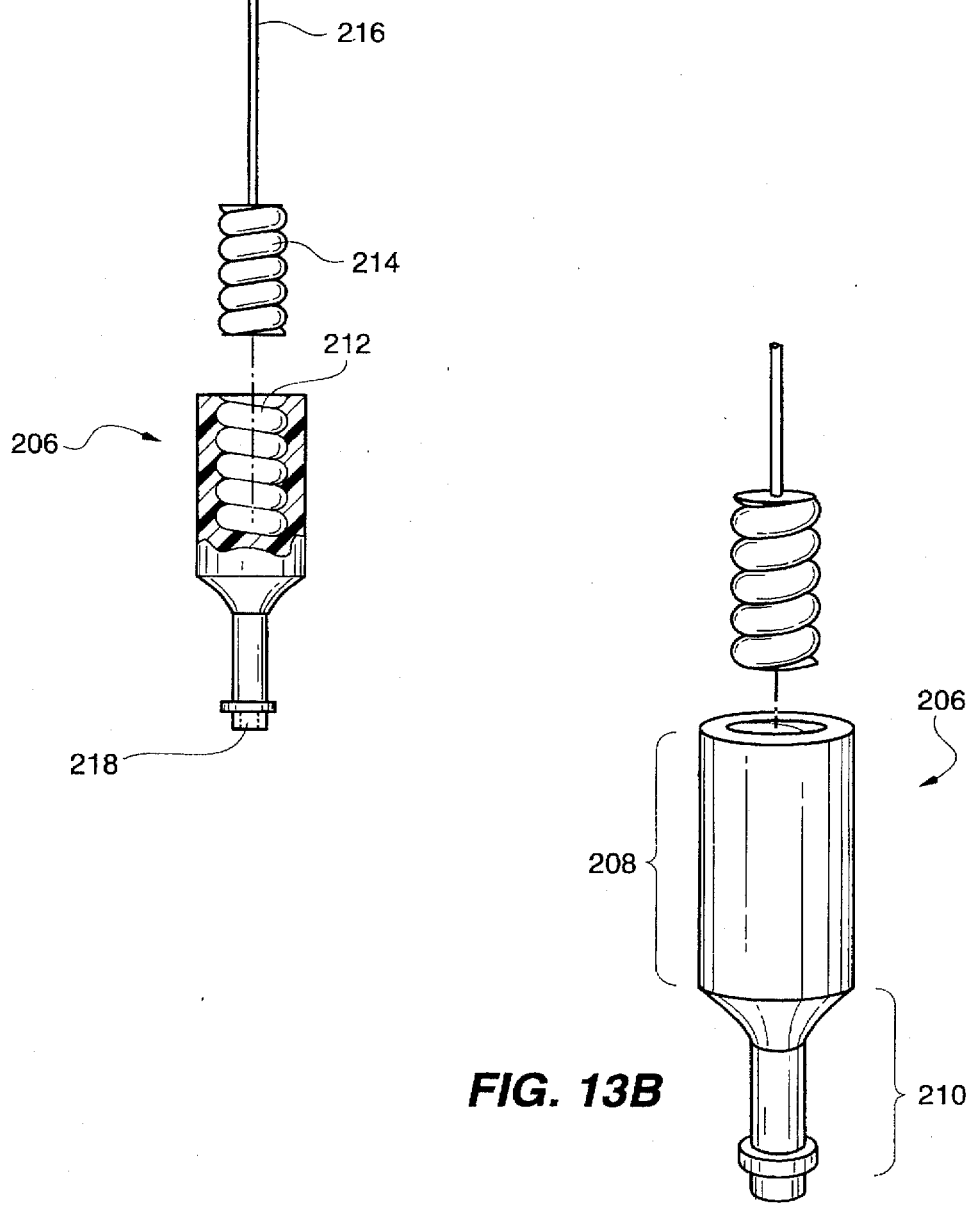
FIG. 13A is a side elevational view, partly in cross-section, of still another umbrella coupler assembly constructed in accordance to the teachings of the present invention which shows the umbrella coupler assembly having a threaded bore capable of receiving a threaded handle of an umbrella.
FIG. 13B is a fragmentary perspective view of the umbrella coupler assembly and umbrella handle shown in FIG. 13A.

In FIG. 13A and 13B there is illustrated an alternative umbrella coupler of the present invention for the support of an umbrella having a shaft and a vertically orientated handle at a lower end of the shaft. Umbrella coupler assembly 206 has an upper cup portion 208 supported by a lower portion 210. Upper cup portion 208 has a threaded bore 212 capable of receiving a threaded handle 214 of umbrella 216 to secure the umbrella thereto. Lower portion 210 may be integral with or capable of being connected to (such as by means of threaded bore 218) a supportive base for vertical support of the umbrella coupler assembly to maintain the umbrella 216 in an upright active position when engaged in umbrella coupler assembly 206.

Figure 14A:
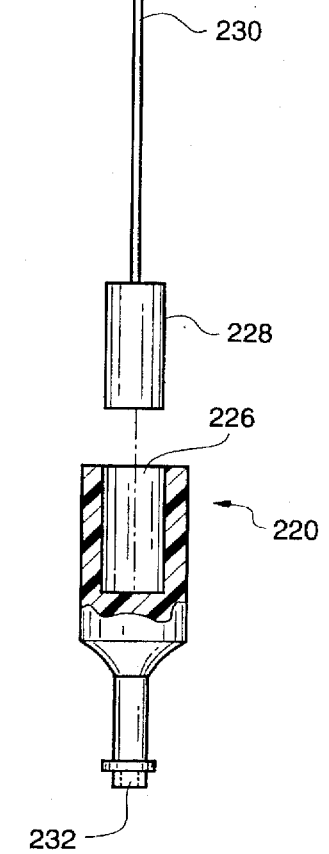
FIG. 14A is a side elevational view, partly in cross-section, of still another umbrella coupler constructed in accordance to the teachings of the present invention which shows the umbrella coupler assembly having a bore capable of receiving a handle dimensioned therefor.
Figure 14B:
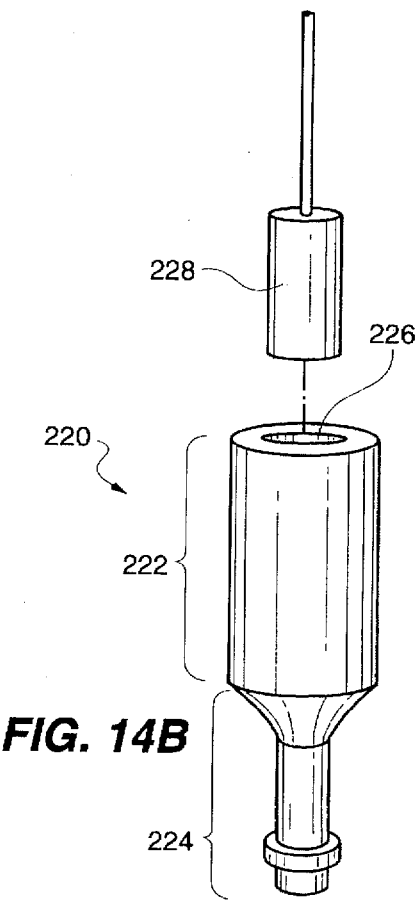
FIG. 14B is a fragmentary perspective view of the umbrella coupler/assembly and umbrella handle shown in FIG. 14A.
Figure 15:
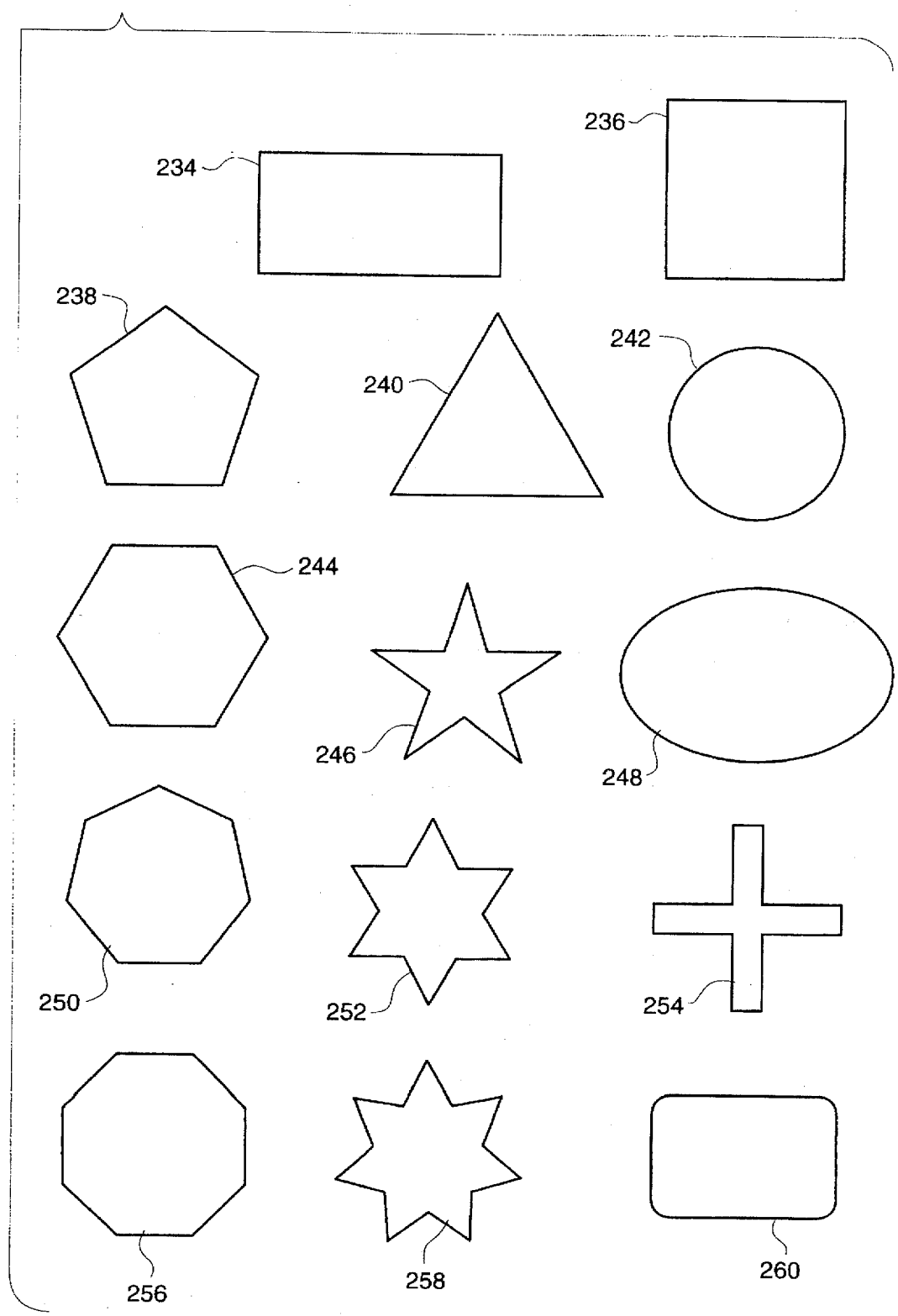
FIG. 15 is a bottom view of various geometric shapes of handles which can support the shaft of an umbrella, such handles capable of being inserted into an umbrella coupler assembly similar to that illustrated in FIG. 14A and FIG. 14B but having a correspondingly shaped bore to receive the same.

FIG. 14A and 14B illustrates another embodiment of the umbrella coupler of the present invention suited for the support of an umbrella having a shaft and a vertically orientated handle at a lower end of the shaft. Umbrella coupler assembly 220 has an upper portion 222 and a lower portion 224, the upper portion having a bore 226 capable of receiving handle 228 of umbrella 230 to secure the umbrella thereto. Lower portion 224 may be integral with or capable of being connected to (such as by means of threaded bore 232) a supportive base for vertical support of the umbrella coupler assembly to maintain umbrella 230 in a upright active position when engaged in umbrella coupler assembly 220. FIG. 15 is a bottom view of a variety of umbrella handles of varying geometric shape, such as elongated rectangular shaped handle 234, square shaped handle 236, five sided shaped handle 238, triangular shaped handle 240, circular handle 242, six sided handle 244, star shaped handle 246, oval shaped handle 248, seven sided shaped handle 250, Hebrew star shaped handle 252, cross shaped handle 254, octagon shaped handle 256, sun shaped handle 258, and rectangular shaped handle 260. Regardless of the geometric shape of the handle, the bore of the umbrella coupler assembly can be shaped to correspond to the particular shape of the handle and receive the same.

The varying embodiments of the umbrella coupler assembly heretofore described can be joined with various types of a supportive base for vertical support of the umbrella coupler assembly.

Figures 16A, 16B:
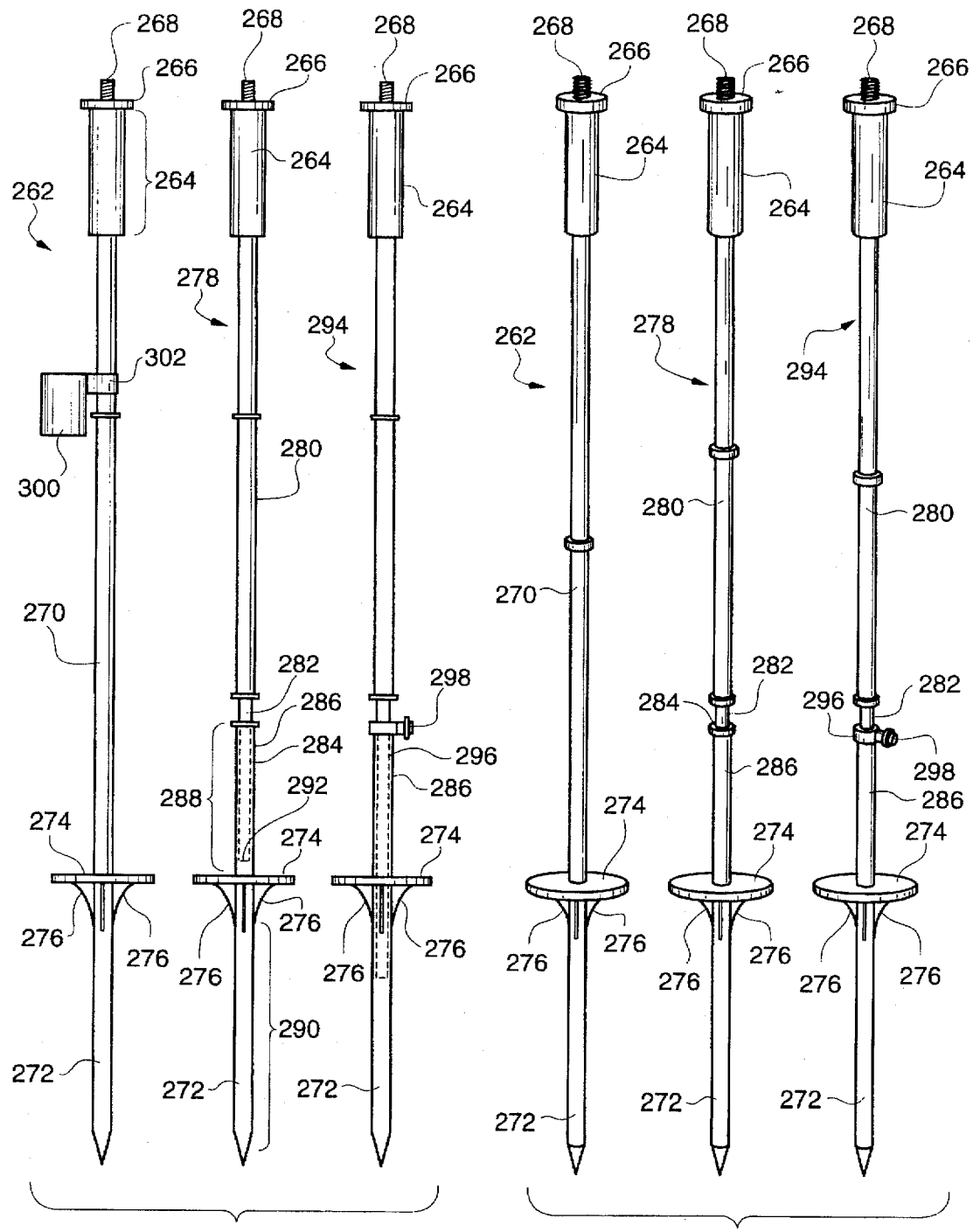
FIG. 16A is a front side elevational view with hidden lines of three support shafts for use as a supportive base for any of the umbrella coupler assemblies previously illustrated, the left shaft being a one piece shaft of integral construction and having a cup accessory attached thereto, the middle shaft being a two piece shaft of fixed vertical depth placement, and the right shaft being a two piece shaft of adjustable vertical depth placement by virtue of securing means.
FIG. 16B is a side perspective view of the three shafts illustrated in FIG. 16A.

At FIG. 16A and 16B there is illustrated three (3) types of support shafts for use as a supportive base umbrella stake. Support shaft umbrella stake 262 comprises upper portion 264 having head 266 and a threaded bolt 268 atop head 266 capable of a threaded connection with a threaded bore of the lower portion of any of the foregoing umbrella coupler assembles heretofore described. Support shaft umbrella stake 262 is of one piece construction and includes vertical rod 270 integral with upper portion 264 which terminates into spike 272 at its lower end. At a lower portion of vertical rod 270 is annular foot ledge 274 which has a plurality of web edges 276 thereunder. Web edges 276 at their top are disposed to the underside surface of annular foot ledge 274 and at their inner facing side are disposed to the vertical rod 270. Web edges 276 serve a dual function, namely to give increase support for annular foot ledge 274 when the same is set into a ground surface and also to increase the total area of contact with the ground surface adding a horizontal or rotational resistance to any movement of spike 272. Annular foot ledge 274 serves as a flange for a user's foot to set spike 272 of support shaft umbrella stake 262 into a ground surface web edges 276 and in stabilizing spike 272 in a ground surface.

Support shaft umbrella stake 278 at FIG. 16A and 16B is of multipiece construction, namely upper portion 264 is integral with a shaft piece 280 which has a tapered lesser-in-diameter lower end 282 that can be received into a vertical bore 284 of stake rod 286. Stake rod 286 has an upper portion 288 and a lower portion 290 terminating in spike 272. Upper portion 288 of stake rod 286 has vertical bore 284 therein at a fixed depth, namely bore seat 292 capable of receiving lower end 282 of shaft piece 280. Stake rod 286 also has the annular foot ledge 274 at an intermediate portion thereof having a plurality of web edges 276 thereunder for setting the spike 272 into a ground surface.

Alternatively, the supportive base for vertical support of the various umbrella couplers of the present invention may comprise a multipiece support shaft umbrella 294 which is vertically adjustable. Support shaft umbrella stake 294 is similar in construction to support shaft umbrella stake 278 with the exception of vertical bore 296 of the stake rod 286 which depth is determined by the turning of clamp assembly 298 to place a clamping force against the lower end 282 of stake rod 286 (see FIG. 19). Clamping assembly 298 or other clamping structure known in the art constitutes means for securing the vertical depth at which one piece of the multipiece support shaft sets into a bore of a receiving piece.

As observed in the unitary support shaft umbrella stake 262 at FIG. 16A, accessories may be provided to support stakes for the present invention, such as drinking cup 300 which has a handle 302 capable of clip attachment to the stake.

Figure 18A:
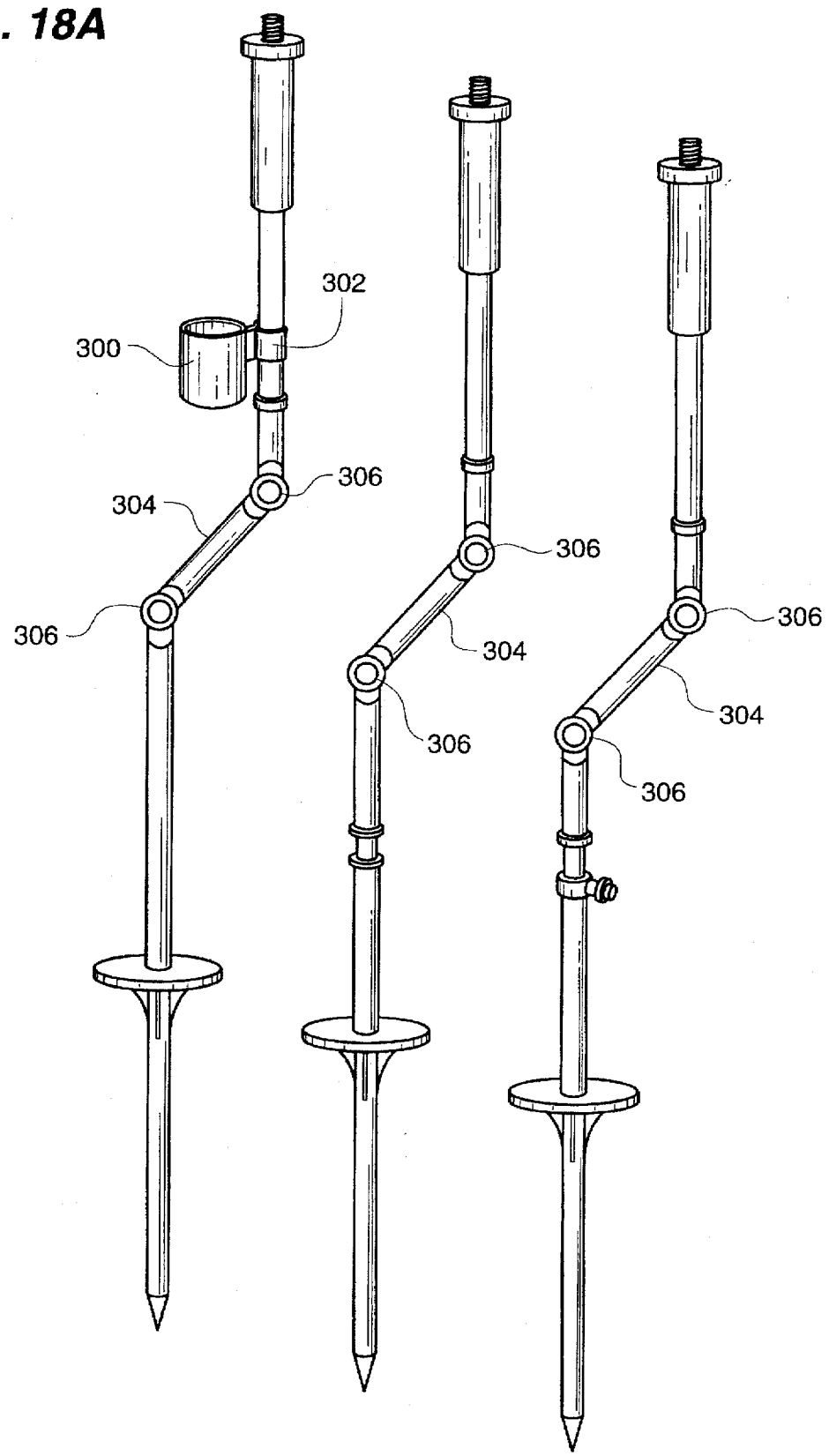
FIG. 18A is a side perspective view of the three horizontal adjustable shafts illustrated in FIG. 18B.
Figures 17, 18B, 19:
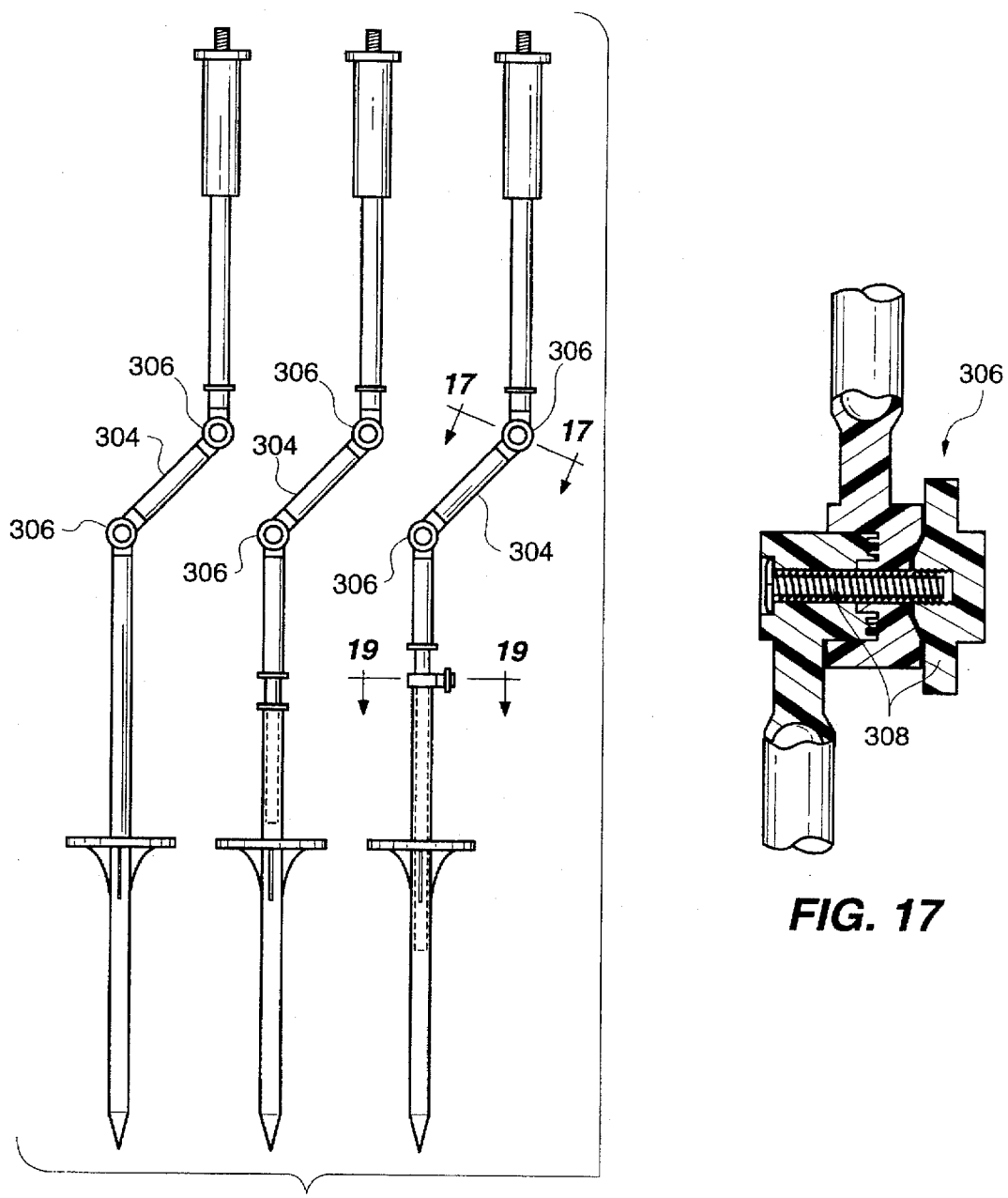
FIG. 17 is a cross-sectional view of means for securing an intermediate section of a multipiece vertical shaft to neighboring sections, is taken along line 17—17 of FIG. 18B and shows the securing means cooperative to provide a horizontally adjustable vertical support for any of the umbrella coupler assembles previously illustrated.
FIG. 18B is a front side elevational view, with hidden lines of three horizontally adjustable support shafts for use as a supportive base for any of the umbrella coupler assemblies previously illustrated, the left shaft being a multipiece shaft, each section of which is of integral construction, the shaft further having a cup accessory attached thereto, the middle shaft being a multipiece shaft having a lower section of fixed vertical depth placement, and the right shaft being a multipiece shaft having a lower section of an adjustable vertical depth placement by virtue of securing means.
FIG. 19 is a vertical cross-sectional view of means for securing the vertical depth at which at least one piece of a multipiece shaft sets into a bore of another, is taken along line 19—19 of FIG. 18B, and shows how a lower section of a horizontally adjustable multipiece shaft can be set at fixed vertical depth.

As observed in the perspective view of FIG. 18A, as well as the side elevational view with hidden lines of FIG. 18B, the varying support shaft umbrella stake embodiments of the present invention may be provided with a horizontal adjustability by means of intermediate section 304 having means for securing 306, such as wing nut and bolt assembly 308 at each end thereof. Wing nut and bolt assembly 308, shown in cross-section in FIG. 17, can be loosened to provide a selected angle setting of intermediate section 304 and then tightened to maintain such angled setting.

Figure 20:
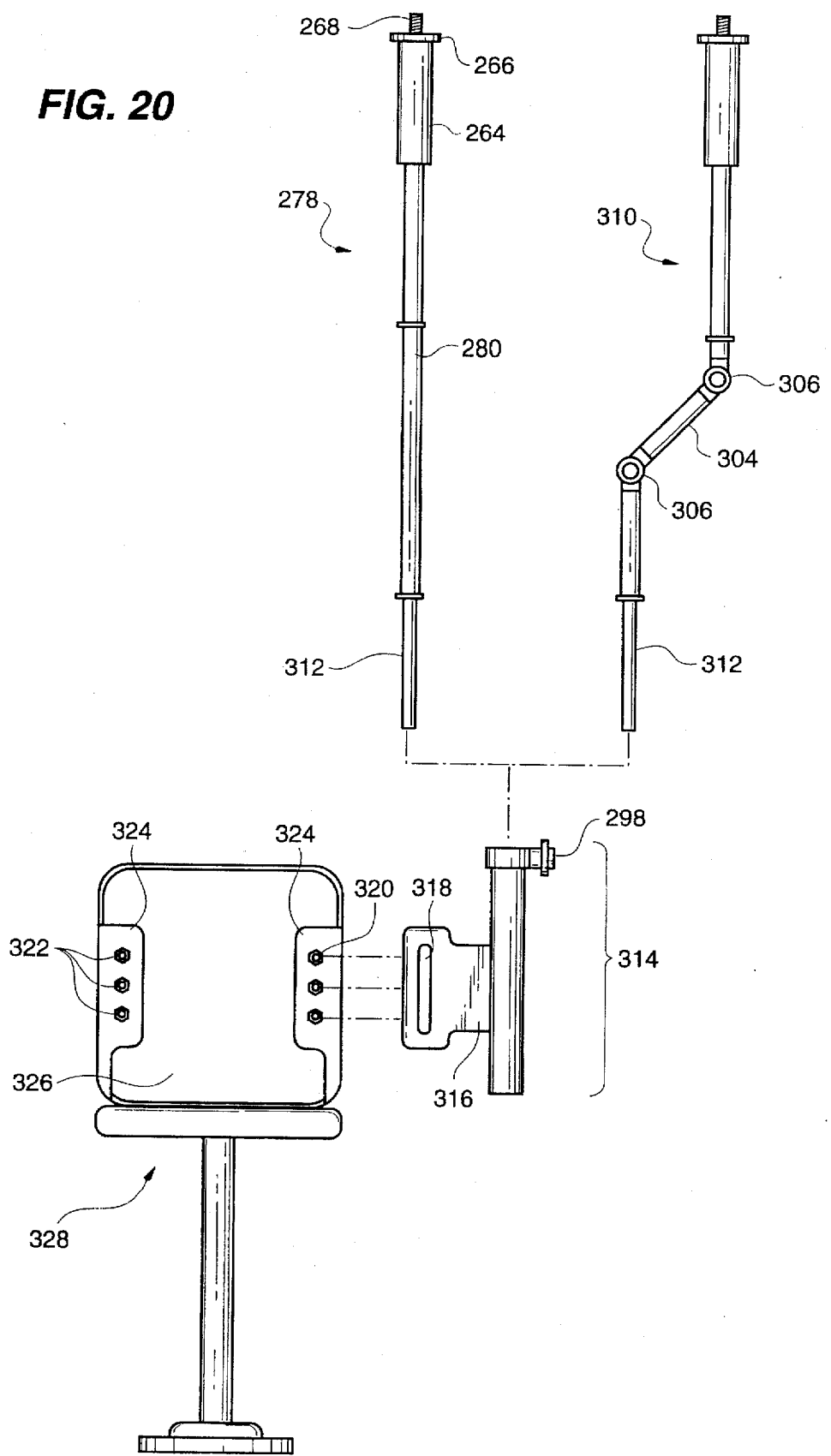
FIG. 20 is a side elevational view of a supportive base and a horizontally adjustable supportive base for any of the umbrella coupler assemblies previously illustrated and shows the same capable of being mounted into a coupling base capable of being affixed to a wall surface such as the back of a chair.

In FIG. 20 there is illustrated upper portion 264 integral with shaft piece 280 of support shaft umbrella stake 278 and umbrella support shaft 310 having an intermediate section 304 with securing means 306 at each end of intermediate section 304 to provide a horizontally adjustable setting of umbrella support shaft 310. Both support shaft umbrella stake 278 and umbrella support shaft 310 have lower tapered ends 312 capable of being set into a receiving tube assembly 314. Receiving tube assembly 314 has a clamp nut assembly 298 at its upper end to secure lower tapered ends 312.

Receiving tube assembly 314 further has a mounting flange 316 integral therewith having a vertical slot 318 which, by mounting means 320, such as screws 322, can be set upon a wall surface 324, such as chair back 326 of chair 328. Thus, it is to be understood that the umbrella coupler of the present invention may have a supportive base which need not be staked into the ground but rather can be directly received in a wall or base surface or indirectly mounted to a wall or base surface via a receiving coupler for the supportive base.

Figures 21A, 21B:
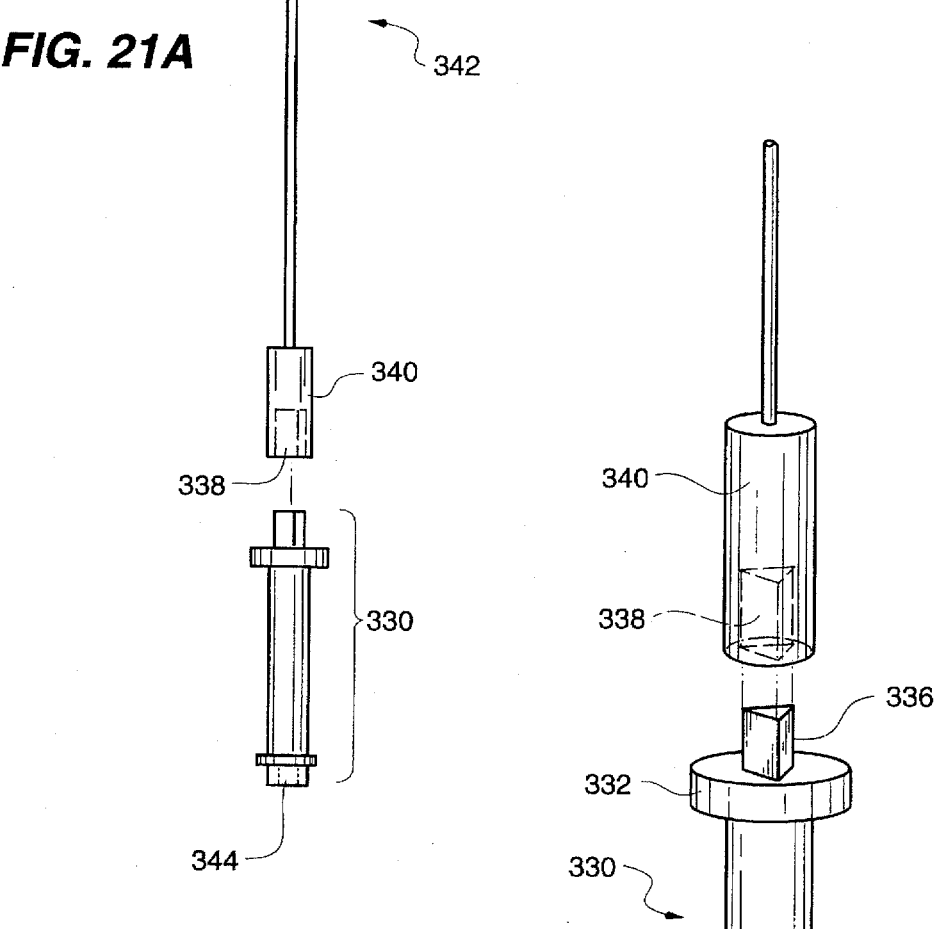
FIG. 21A is a side elevational view of still another umbrella coupler assembly constructed in accordance to the teachings of the present invention which shows the umbrella coupler assembly at an upper end thereof having a triangular shaped male member thereon capable of a engagement within a correspondingly triangular shaped female bore of an umbrella handle.
FIG. 21B is a fragmentary perspective view of the umbrella coupler assembly and umbrella handle with hidden lines shown in FIG. 21A.

In FIGS. 21A and 21B there is illustrated another embodiment of the umbrella coupler of the present invention for the support of an umbrella having a shaft and a handle at the lower end of the shaft having a triangular shaped bore. In this embodiment, the umbrella coupler assembly 330 has a head 332 upon a vertical shaft 334, the head having a male member 336 thereon capable of an engagement within the correspondingly shaped female bore 338 of handle 340 to thereby secure the umbrella 342 to the umbrella coupler 330. The umbrella coupler 330 as in other embodiments may be integral with or capable of being connected to (such as by means of threaded bore 344) a supportive base for vertical support of the umbrella coupler assembly to maintain the umbrella 342 in an upright active position when engaged on the umbrella coupler assembly 330. Male member 336 is illustrated at FIG. 21A and FIG. 21B as being triangular shaped for complimentary engagement within triangular shaped female bore 338, however it is to be understood that male member 336 and female bore 338 can be of a variety of shapes, such as all shapes illustrated at FIG. 15, provided the shape of the male member 336 corresponds to the shape of the female bore 338 to cooperatively allow mounting of the female bore of the umbrella handle upon the male member of the umbrella coupler assembly to secure the umbrella thereto.

The several umbrella coupler embodiments of the present invention and its accessories, such as the various supportive base for the umbrella coupler assemblies, are preferably made from a thermoplastic material or other suitable material in manners known in the manufacturing arts either as a unitary integral unit or as a multipiece cooperative assembly.

The umbrella coupler and accessories thereto of the present invention has a number of advantages, some of which have been described above and other of which are inherent. Additionally, modifications and changes may be in the form, construction, and arrangement of the parts of the present invention with departing from the spirit and scope thereof. For example, rather than the lower portion of the various umbrella coupler assemblies of the present invention having a threaded bore for engagement with a cooperative threaded rod at the top of a supportive base, such lower portion may be tapered to be of a lesser diameter to fit within a greater diameter of a receiving aperture of the supportive base to form an interference fit connection. Further, there exists in the prior art a variety of clamps, clasps, clips, jaws, ties, nut and bolt assemblies, locks, links, and the like which may accommodate the function of support means for selective vertical support of an umbrella shaft with a supportive base, or means for securing a component piece of a multipiece supportive base to another component piece, or means for securing the vertical depth at which one piece of a multipiece supportive base sets into a bore of another component piece, or means for mounting a supportive base for the umbrella coupler. Accordingly, the scope of the invention is only to be limited as necessitated by the accompanying claims.

I claim:

1. An umbrella coupler for the support of an umbrella having a shaft and either a J-shaped or vertically orientated handle at a lower end of said shaft, said umbrella coupler comprising:

an umbrella coupler assembly having a lower portion, a seat surface supported by said lower portion, a middle wall portion upon or bordering said seat surface, an upper portion, and an arm extending from said upper portion, said middle wall portion at least partially extending upwardly from said seat surface to said upper portion and further having an opening dimensioned to receive and support a J-shaped umbrella handle, and a partial ring structure connected to said arm capable of achieving an open and closed position for selective vertical support of said shaft of said umbrella, said partial ring structure forming a receiving C-shaped mouth when in said open position and forming a retention ring when in said closed position.

2. The umbrella coupler of claim 1 wherein said partial ring structure comprises an outer partial ring having a rail receiving groove at its inner facing annular periphery and an inner partial ring having a rail at its outer facing annular periphery, said rail of said inner partial ring being cooperatively received within said rail receiving groove of said outer partial ring to allow a rotational movement of one partial ring relative the other.

3. The umbrella coupler of claim 2 wherein said rail of said inner partial ring has a plurality of seating knobs thereon cooperative with a plurality of seating apertures in the rail receiving groove of said outer partial ring to achieve a lock and unlock position of the outer partial ring to the inner partial ring.

4. The umbrella coupler of claim 1 wherein said partial ring structure comprises a clasp.

5. The umbrella coupler of claim 1 wherein said partial ring structure is vertically aligned over said seat surface.

6. The umbrella coupler of claim 1 wherein said opening at least partially extends at an oblique angle.

7. The umbrella coupler of claim 1 further including a supportive base integral with or connected to said lower portion to maintain said umbrella in an upright active position when engaged in said umbrella coupler assembly.

8. The umbrella coupler of claim 7 wherein said supportive base is integral with or capable of connection to a receiving coupler having means for securing the receiving coupler to a wall surface.

9. The umbrella coupler of claim 7 wherein said supportive base comprises a one piece support shaft having a spike portion at the lower end thereof.

10. The umbrella coupler of claim 9 wherein said one piece support shaft further includes a foot ledge to aid in the setting of said spike portion of said support shaft into a ground surface.

11. The umbrella coupler of claim 10 wherein said foot ledge is annular surrounding said support shaft and further includes a plurality of web edges, the top of which is disposed adjacent the underside surface of said foot ledge and a side of which is disposed adjacent to said support shaft.

12. The umbrella coupler of claim 7 wherein said supportive base comprises a multipiece support shaft, at least one piece of the multipiece support shaft having a bore therein for receiving another piece of the support shaft.

13. The umbrella coupler of claim 12 further including means for securing the vertical depth at which at least one piece of the multipiece support shaft sets into said bore.

14. The umbrella coupler of claim 12 wherein said multipiece support shaft has an intermediate section bordered by means for securing said intermediate section to its neighboring sections at each end of said intermediate section, said means for securing allowing said intermediate section to be set at a selected angle.

15. The umbrella coupler of claim 7 wherein said supportive base further includes a cup attachable to said supportive base.

* * * * *